United States Patent
Venkateswar et al.

(10) Patent No.: US 6,532,016 B1
(45) Date of Patent: Mar. 11, 2003

(54) METHOD OF PROCESSING PRINT DATA USING PARALLEL RASTER IMAGE PROCESSING

(75) Inventors: Vadlamannati Venkateswar, Plano, TX (US); Praveen K. Ganapathy, Karnataka (IN); Ralph E. Payne, Dallas, TX (US); Arunabha Ghose, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/956,402

(22) Filed: Oct. 23, 1997

(51) Int. Cl.[7] .............................................. G06F 15/16
(52) U.S. Cl. ........................ 345/504; 345/505; 345/519
(58) Field of Search ................................ 345/501, 502, 345/504, 505, 506–509, 519; 395/101, 115, 116; 358/1.01, 1.15, 1.16

(56) References Cited

U.S. PATENT DOCUMENTS

| | | | | |
|---|---|---|---|---|
| 5,157,765 A | * | 10/1992 | Birk et al. | 345/505 |
| 5,333,246 A | * | 7/1994 | Nagasaka | 345/502 |
| 5,392,393 A | * | 2/1995 | Deering | 345/505 |
| 5,594,860 A | * | 1/1997 | Gauthier | 345/501 |
| 5,717,840 A | * | 2/1998 | Pardo | 395/115 |
| 5,768,489 A | * | 6/1998 | Adachi et al. | 395/117 |

OTHER PUBLICATIONS

IEEE Computer Graphics & Applications, "A single–chip Multiprocessor for Multimedia: The MVP" by Guttaj et al pp 53–64, Nov. 1992.*
Ellsworth, D "A New Algorithm for Interactive Graphics on Multicomputers", IEEE Computer Graphics and Application pp 33–40, Jul. 1994.*
Molnar et al "A Sorting Classification of Parallel Rendering". IEEE Computer Graphics and Applications, pp 23–32, Jul. 1994.*

* cited by examiner

Primary Examiner—Kee M. Tung
(74) Attorney, Agent, or Firm—Wade James Brady III; Frederick J. Telecky, Jr.

(57) ABSTRACT

A method of processing print data allowing for rendering bands of print data in parallel. A main processor (52) of a single-chip multiprocessor converts an incoming page of print data into paths. The paths are then converted to primitives and the primitives are rasterized using parallel processor (60, 62, 64, 66). The parallel processors (60, 62, 64, 66) work in concert with the main processor (52) such that bands of the final print image are rendered into a frame buffer (58) in parallel, allowing for faster and more efficient processing of print data.

3 Claims, 3 Drawing Sheets

METHOD OF PROCESSING PRINT DATA USING PARALLEL RASTER IMAGE PROCESSING

BACKGROUND OF THE INVENTION

1. Field of the Invention

This invention relates to raster image processing in printing systems, more particularly to such processing in a system with a main processor and several parallel processors.

2. Background of the Invention

Modern printing systems use some sort of processor to interpret a program representing the image to be printed. The program is written in a page description language (PDL) that describes the image on the page in a format that the processor can understand. The processor must then convert the page description into a format that is compatible with the actual printing hardware, called a raster bit-map. This is typically a two-step process. The first step is interpretation and the second is rasterization.

During interpretation the PDL is parsed and dictionaries are searched that allow translation of the PDL operators into paths. Paths are sets of graphical objects describing the outlines of graphical objects and are accompanied by fills. The graphical objects are usually described in terms of straight lines and parametric curves, such as bezier curves, splines, etc. A fill value is a single solid color that specifies the color of the fill area inside the outlines. Sometimes these fills occur through masks. In some cases, the fill value is not a single color but a scanned image.

Paths are transformed from source coordinate space to the device coordinate space, the device being the hardware of that particular printer. The paths are then reduced to polygons through a piece-wise linear approximation of any constituent parametric curves. The polygons are then further reduced to lower level primitives, such as trapezoids and/or run-arrays. The goal of all of this reduction is to simplify the second stage of the process, rasterization.

Other tasks are also performed during interpretation such as color conversion, decompression and outline font processing. Color conversion means converting data from source color space to device color space. Decompression is only necessary if the incoming image data is in a compressed format such as JPEG or LZW. Fonts are usually in outline form in which they are described in terms of straight lines and bezier curves, and must be converted into bitmap format at this stage.

The second stage of the process is rasterization. In this stage, the previously produced graphics primitives are scan converted, screened and rendered into the frame buffer of the print hardware. This is typically the most time consuming stage of the process, due to the high resolution required of most printing systems.

Current systems typically use one processor that has to perform all of the above tasks. These tasks are performed sequentially resulting in a slow and inefficient printing process. Therefore, a system and method is needed to allow more efficient and faster raster image processing for printing systems.

SUMMARY OF THE INVENTION

In accordance with embodiments of the invention, a page of print data is processed by a single-chip multiprocessor in three stages to convert the print data to a bit map. The term single-chip multiprocessor is used to describe the parallel processors used in the invention, which are all resident on the same semiconductor chip. The main processor may be on that same single chip or may be external to the chip having all of the parallel processors.

In the first stage, called language interpretation, the page description is converted to paths with accompanying fill and mask values. The paths and their fills and masks undergo geometry processing in the second stage. Geometry processing can be further broken down into two parallel stages: boundary processing and source data processing. During boundary processing the paths are segmented to low level primitives (triangles, trapezoids, etc.) Source data processing involves operations on fills and masks such as decompression, color conversion, outline font processing, etc. Finally the low level primitives are rasterized into a frame buffer, which is then sent to the print engine. In one embodiment of the invention, the frame buffer is segmented and used to allow the main processor and the parallel processors to render bands of the final image in parallel.

In a sort-first embodiment of the invention, the main processor creates the paths using some assistance from the parallel processors to accelerate the tasks. This is typically done by using a task queue, with all of the parallel processors eligible to assist. The parallel processors then perform the boundary processing part of geometry processing to convert the paths to primitives and the rasterization to send the data to the print engine. In an alternate sort-first embodiment, a subset of the parallel processors are dedicated to assisting in the language interpretation of a current page and a second subset performs the geometry processing and rasterization of the previous page.

In a sort-middle embodiment, the main processor sends the paths to geometry processing parallel processors which then send the primitives to the rasterization processors in a round-robin or queue manner. An alternate embodiment, the geometry processing parallel processors perform geometry processing for the current page and the rasterization processors work on the previous page. In a third embodiment, all of the parallel processors perform geometry and then rasterization processing on one page.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
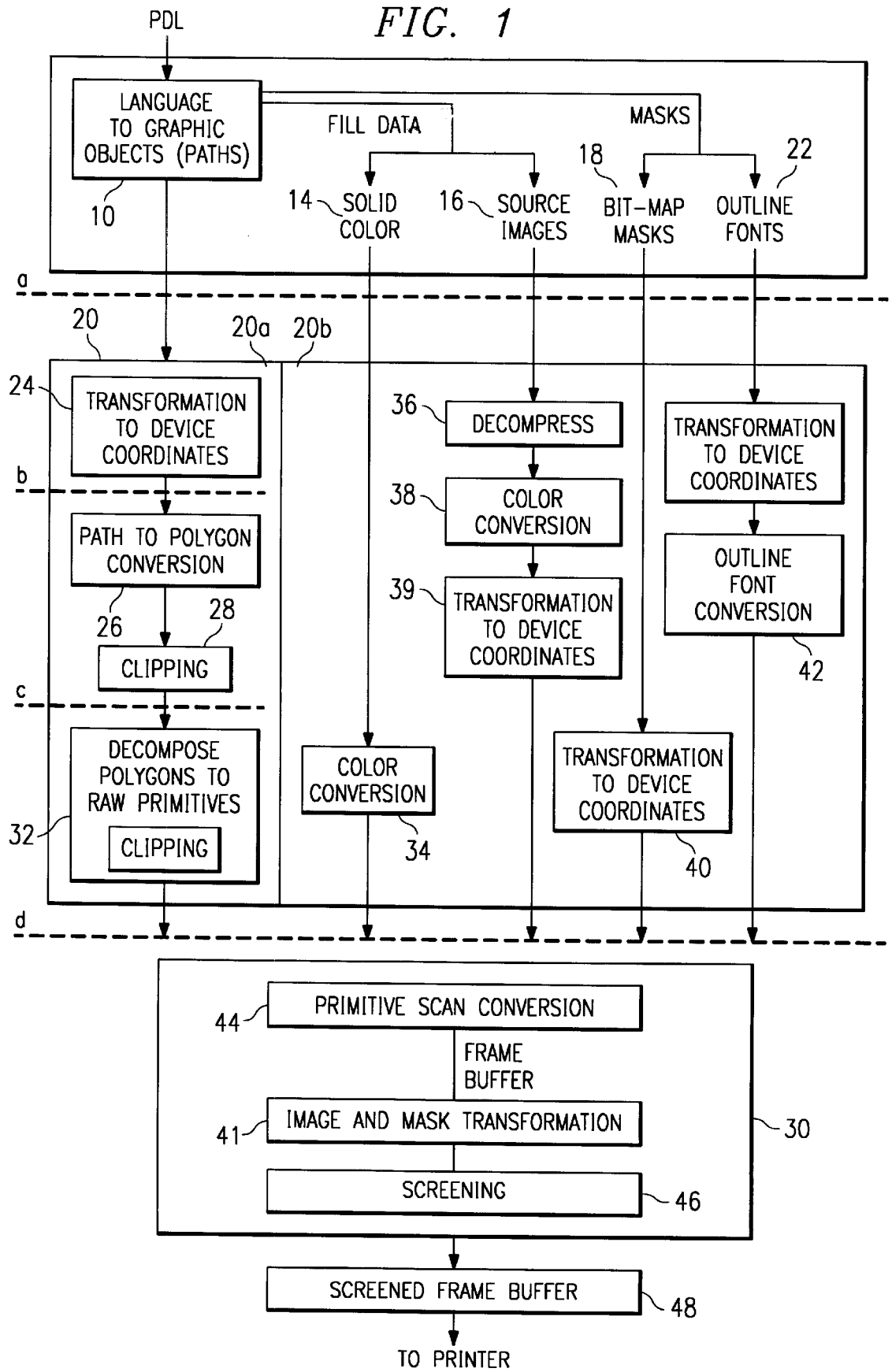
FIG. 1 shows a flowchart of a raster image processing pipeline in accordance with the invention.

FIG. 1 shows a raster image processing pipeline flowchart. Current approaches identify two steps, interpretation and rasterization. In accordance with the present invention, three steps are identified by dividing the conventional interpretation step into two steps: language interpretation and geometry processing. The functions enclosed in box 10 involve language interpretation, those in box 20 are geometry processing and those in box 30 are rasterization processes. The raster image processing starts when a PDL is sent to the processor. The processor then converts the PDL to graphic objects at step 10. This step then generates graphic objects, hereinafter called paths, which move to geometry processing in box 20. In addition to the graphic objects generated, the fills for those objects are also identified. Fills can be single solid colors 14 or scanned images 16. Any masks associated with the objects are also identified. Some masks are in a bitmap format 18, others are in an outline form 22 and will be converted to a bitmap in the next step.

All of the resulting data at points 10, 14, 16, 18 and 22 then undergoes geometry processing in box 20. The data going on for geometry processing undergoes either boundary processing in box 20a or source data processing in box 20b.

The graphics objects produced in step 10 undergo boundary processing starting at box 24. The graphics objects which are defined in some source coordinate space are transformed to device coordinate space. At step 26 the objects are then converted to polygons for easier handling. If necessary or desired, clipping of the polygon can be performed at step 28. Finally, at step 32, the polygons created in step 26 are converted to primitives. Graphics primitives can be trapezoids, triangles, run-arrays, etc. Such primitives are easier for typical graphics processors to handle than polygons. On a specialized processor, such as the MVP (TMS320C80, by Texas Instruments) polygons are also easily handled. This allows a choice not to further decompose polygons into primitives. However, for this discussion, reduction to primitives is assumed.

The data for the fills and masks undergoes source data processing. The solid color fills from step 14 must be converted from the source color space to the device color space at step 34. Source image data that is compressed, such as in JPEG format, must be decompressed at step 36 and then converted from source color space to device color space at step 38. Outline font data is first transformed from source to device coordinate space and then converted to bitmap masks at step 42.

Source data processing can also include transformation of image and bitmap masks from their source to the device coordinate space as shown at steps 39 and 40, respectively. Alternately, such transformations can be performed during scan conversion (transformation on the fly) at step 44.

The rasterization process 30 has two stages: scan conversion, and halftoning. During scan conversion, 44, the input graphics primitives which are described in a graphical form (for example, a triangle is described by its three vertices) is converted to a pixel form and written to the frame buffer. After all the primitives are scan converted, the frame buffer is screened/half-toned at step 46. It is also possible to perform screening during scan conversion as discussed further in U.S. patent application Ser. No. 08/941,871, entitled "Screening Methods for a Single-Chip Multiprocessor." During screening the bit-depth of the pixels in the frame buffer is reduced to match that of the device. Finally the screened frame buffer is sent to the printer device for marking a page.

Throughout this process there are several possible places to implement clipping. Clipping is the process where a graphics object is modified to fit within the desired view window by clipping it to the view window boundaries. Clipping could occur at steps 28 when a polygon is clipped to result in new polygons or at step 32 during the polygon decomposition process. It could also occur at step 44 during can conversion. In this case, clipping is done on the fly, with the clip window being used as a boundary and only those pixels that fall within that boundary being generated by the scan-conversion process.

Regardless of where clipping is used, the entire process can be implemented using one processor or multiple processors. However, current implementations have a problem with speed and efficiency in the process. Using a single processor results in that processor having to perform all of the above functions. This obviously leads to bottlenecks and inefficiencies, especially in the rasterization process.

Parallel processing of this data can be done using a single chip multiprocessor. This type of implementation usually occurs in one of two ways. The first approach divides the frame buffer into several tiles equal to the number of processing elements (PE) and associates one PE with that tile. This can lead to low processor utilization when few processors are involved. A second approach is to use a virtual buffer system. In this type of system, the first set of regions are assigned a like number of PEs. When a PE is done with its region, it picks up the next region in the pipeline. This allows for dynamic scheduling and higher processor utilization.

This last approach can be adapted for use with embodiments of the present invention. In one embodiment of the invention, a page is logically divided into several bands. Suppose memory is available for the entire page, then in the preferred embodiment the p parallel processors (PPs) are first assigned to the first p bands, where p is the number of PPs. As soon as a PP finishes generation of pixels for that band it is assigned to the next band to be processed in the sequence. After all the bands are rasterized, the frame buffer is transferred to the print engine for printing.

To save memory costs, it may be desirable to assign a memory with less than the full page buffer size to the processor. For example, suppose (p+k) bands fit in the available memory. The memory is divided into (p+k) band buffers, where p is the number of PPs. The printer can still operate with the lesser memory if the PPs can rasterize fast enough into the remaining band buffers as one is transferred to the printer for printing. In other examples, the number of buffers (p+k) may be equal to the number of processors p (k=0), or even less than the number of processors.

A scheduler process running on the MP operates in the following manner. A free band buffer and PP are assigned for each band in sequence. A server process running on the PP is allowed to rasterize the corresponding primitives for that band into the band buffer. This server process is described in U.S. patent application Ser. No. 08/957,475, "Embedded Display List Interpreter," incorporated by reference herein. The scheduler process then waits for the next free processor and free band buffer to assign to the next band.

When the server process on the PP finishes its rasterization task it interrupts the scheduler process to signal that it is free. The scheduler adds the PP to its free list.

A printer imaging process interrupts the scheduler process when the print is engine is ready for the next band. The scheduler responds by initiating a transfer process for the corresponding buffer. When the transfer is completed, the transfer process interrupts the scheduler and the scheduler puts the corresponding band buffer in its free list.

Note that initially all PPs and band buffers are on the free list. It is advantageous to start the print engine when the first (p+k) bands are rasterized to the available (p+k) buffers. When the printer process interrupts the scheduler for the next band, it must be immediately available for certain printers that cannot stop once printing is initiated. For such printers it may be advantageous to identify complex bands and pre-render them before the print-engine is started.

The segmentation of graphical objects to their respective bands is termed "bucketization" as the graphical objects are indexed into buckets/bins corresponding to each band. With reference to FIG. 1, bucketization can occur at points a, b, c, or d, in the raster image processing pipeline. Following a classification scheme for #D parallel rendering presented in S. Molnar, et al. "Sorting Classification of Parallel Rendering" (IEEE Computer Graphics and Applications, Vol. 14, No. 4, July 1994,) points a, b, and c correspond to sort-first so approaches and point d corresponds to a sort-middle approach.

Sort-first refers to schemes where graphics objects are sorted into their respective bands during geometry processing. Sort-middle schemes redistribute or bucketize graphics objects to their respective bands between geometry processing and rasterization. Bucketization may involve explicit clipping of graphics objects to the bands or such a clipping could be performed on the fly during rendering when a PP draws an object subject to the clip boundary.

Figure 2A:
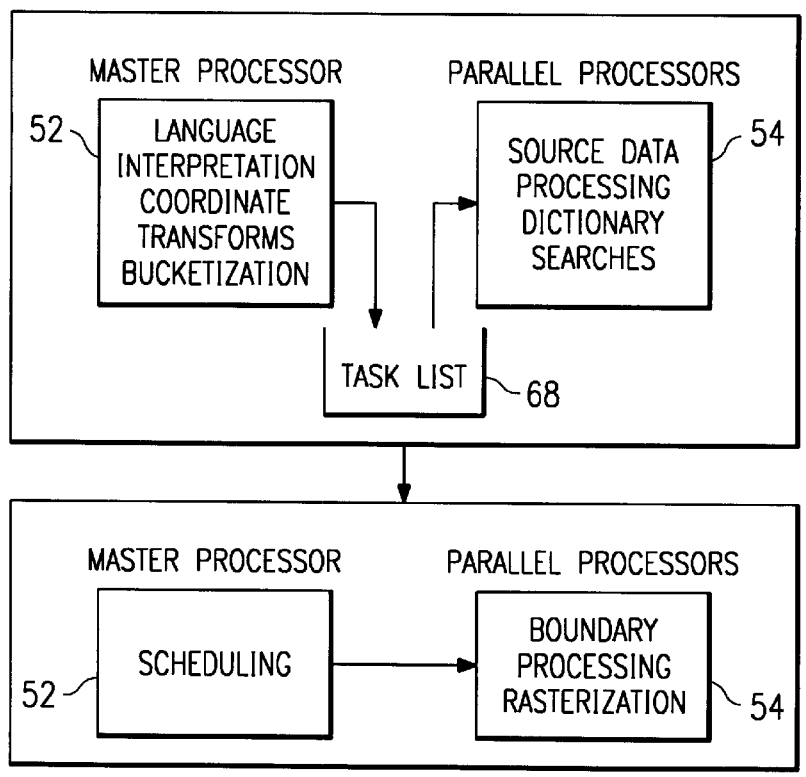
FIGS. 2a and 2b show sort-first implementations of one embodiment of the invention.
Figure 2B:
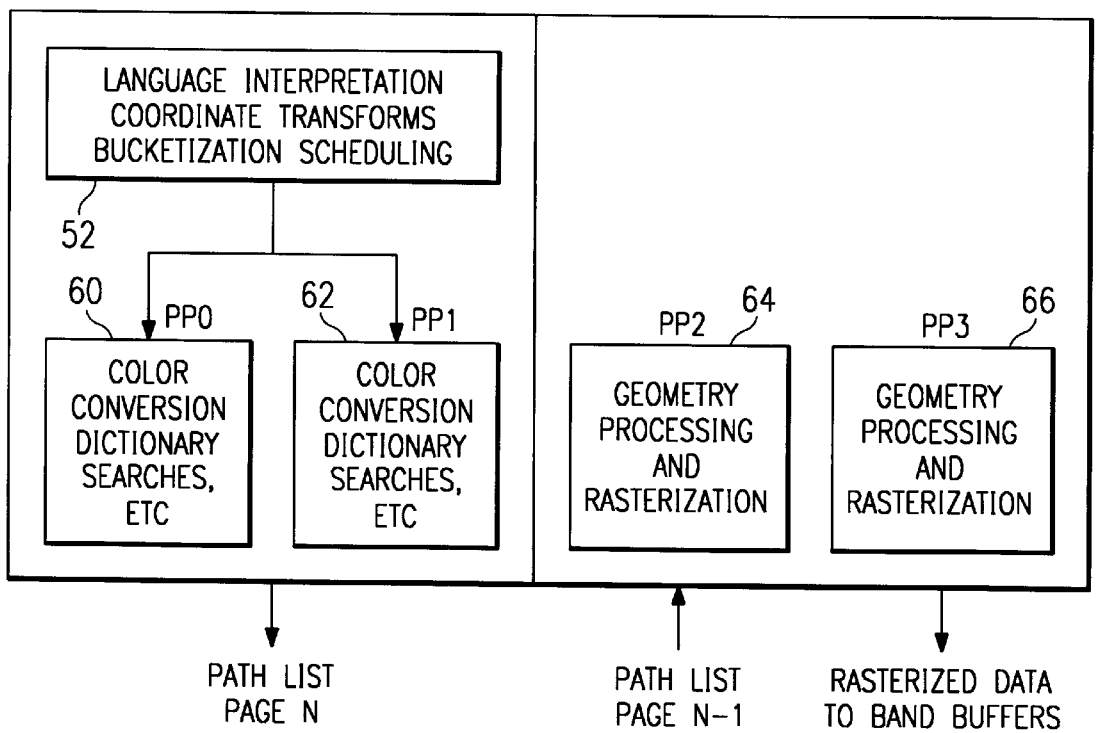

In one embodiment of the invention, the raster image processing is done in a sort-first manner as shown in FIGS. 2a and 2b. Referring to FIG. 1, points b and c are better bucketization points as bucketization is significantly simplified after transformation to device coordinate space in step 24. Although bucketization point c in FIG. 1 is shown after clipping 28, it can also occur before.

Note that the bucketized paths or polygons, if bucketization is at point c, have to be clipped to the band boundaries when drawn. In one embodiment of the invention, it is the responsibility of the PP processing the corresponding paths to perform this clipping. A feature of the sort-first embodiment is that the same PP performs a significant amount of geometry processing and all of the rasterization tasks on high level objects (paths or polygons).

A second scheme is a sort-middle scheme where primitives are first generated from the high-level objects and are then assigned to their respective bands, at point d in FIG. 1. In one embodiment of the invention, one set of PPs can perform the primitive decomposition (geometry processing) while a different set may perform the rasterization depending upon the bands to which a primitive is assigned.

One embodiment of a sort-first implementation using a single-chip multiprocessor is shown in FIG. 2a. In this embodiment, the master processor (MP) 52 performs language interpretation and the coordinate transformations of the resultant paths. The PPs 54 are used to accelerate the language interpretation tasks, like dictionary searches, etc. The PPs are also used to perform source data processing tasks such as color conversion. The MP 52 can push such tasks onto a task queue 68 and the PPs 54 can consume the task in the queue. The MP can then continue with its thread of execution. The paths generated in this process are 'bucketized' into their respective bands by the MP, which can possibly use the PPs for acceleration of the task. In the second stage of processing, the paths are decomposed to polygons, the polygons to primitives (trapezoids, etc.) and the primitives are rasterized.

In a second embodiment, the MP performs language interpretation and coordinate transformations for page N, as shown in FIG. 2b. A subset of the PPs block 54 from FIG. 2a are used as compressors by the MP. In this example, there are 4 PPs, 60, 62, 64, and 66, but the single-chip multiprocessor could have any number of PPs. In this example, the first two PPs, 60 and 62 perform source data processing tasks such as color conversion (based on a task queue created by the MP) and can also act as dedicated compressors for accelerating such tasks as dictionary searches. The MP also performs bucketization, which was discussed above. During this time, the other PPs, 64 and 66, perform geometry processing and rasterization for the previous page.

Figure 3A:
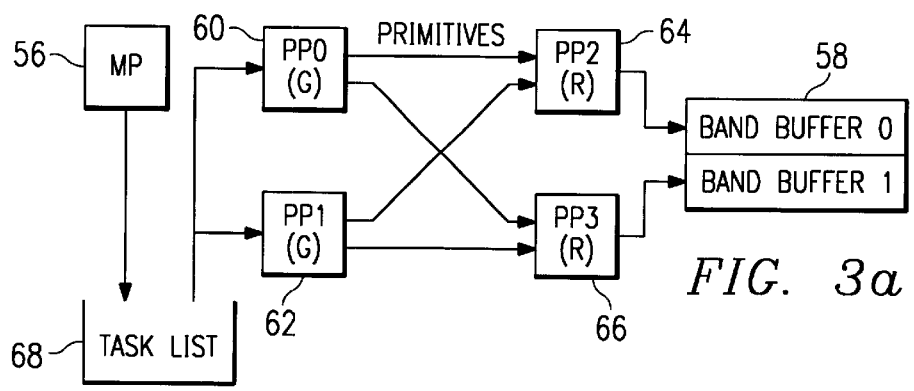
FIGS. 3a–c show sort-middle implementations of one embodiment of the invention.
Figure 3B:
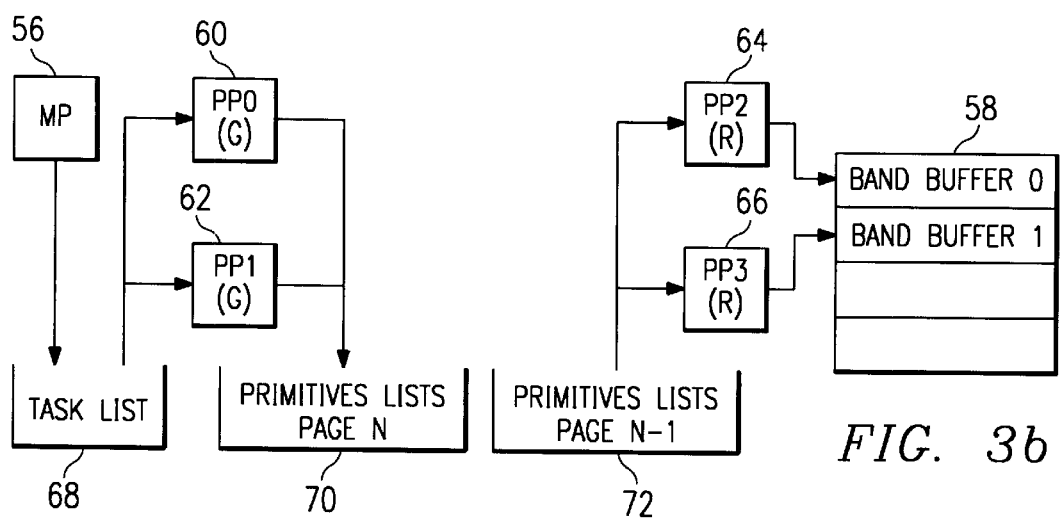
Figure 3C:
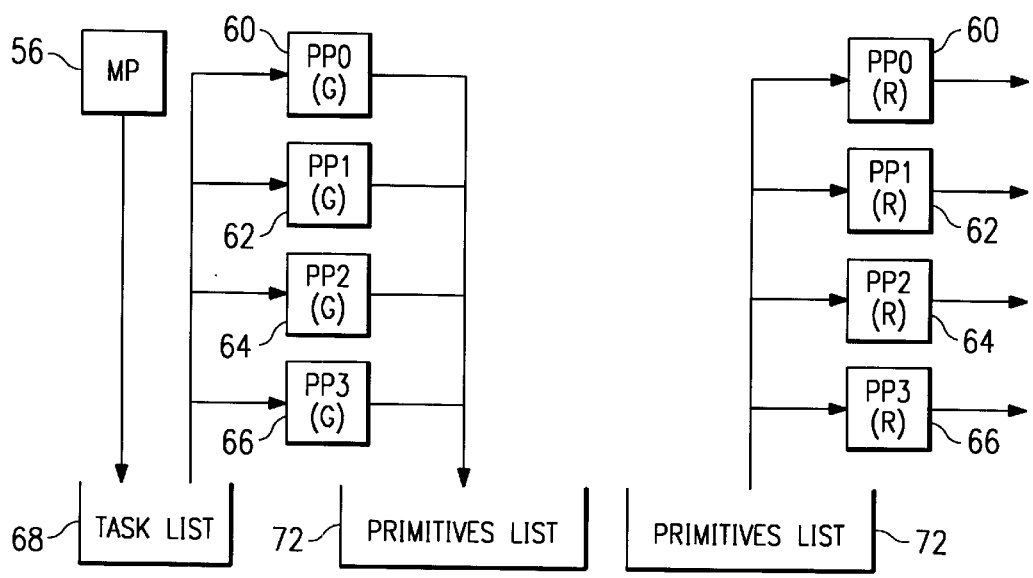

Another embodiment of the invention is to use a sort-middle approach. Examples of this type of implementation are shown in FIGS. 3a–3c. The main processor performs language interpretation, generates paths and passes them to the geometry processing PPs, 60 and 62. This assignment can be a round-robin fashion or through a queue, where a geometry processing P that is free picks up the next element in the task list 68. The geometry PPs, 60 and 62, then generate the primitives list and pass it to the rasterization PPs, 64 and 66. This could be done by the geometry PPs pushing the primitive to either one of the rasterizing PPs' queue. The frame buffer 58 is divided into two bands. One rasterizing PP handles the top band, Band Buffer 0, and the other PP handling the lower band, Band Buffer 1.

In a second embodiment, the geometry PPs 60 and 62 work on generating the primitives list for page N, 70 and the rasterizing PPs 64 and 66 rasterize the display list for page N-1 72. This is shown in FIG. 3b. In this case the frame buffer can be divided into multiple band buffers and the virtual buffer approach discussed earlier can be used, unlike the previous case.

FIG. 3c shows a third method of the sort-middle embodiment of the invention. In this embodiment the PPs are time shared. All four PPs, with four PPs meant only as an example, perform geometry processing to create the primitives list for the current page 72. The primitives list is then used by the same four PPs for rasterization.

During the rasterization part of the overall process, exemplified by FIG. 1, the PPs consume the graphics primitive list (the display list) corresponding to their assigned band, one at a time. In the above implementations, for example, trapezoids may be the primary primitives. The rendering program on the PPs first reduces the trapezoids to guide tables. A guide table is an on-chip table that contains the base address for each scan-line segment of the trapezoid and the number of pixels in the segment.

Transfers between the MP, the various PPs and memory buffers are handled by some type of transfer controller (TC) (not shown). A TC is typically a sophisticated DMA controller that can be programmed to handle block data transfers, such as handling packet transfer requests in a round-robin fashion. Once the guide table is generated, a packet transfer request is submitted to the TC with the guide table pointer and the requested fill value. The TC translates the guide table to the appropriate sequence control signals and loads the data and address buses with the appropriate data to create the trapezoid in the band buffer.

The use of a single-chip multiprocessor with several parallel processors and a main processor allows overlapping between the guide table processing and trapezoid pixel data transfers. The main processor may be on the same chip as the parallel processors or the main processor may be on one chip and the parallel processors on another. For example, the PP could set up the guide table for the next transfer in one data RAM, while the TC uses the guide table in another data RAM to affect the current transfer. The single-chip multiprocessor used should have some means for allowing simultaneous access to these independent data RAM. One example of such an access means is through a crossbar switch.

Thus, although there has been described to this point a particular embodiment of a method to allocate rasterized image processing among the processors on a single-chip multiprocessor, it is not intended that such specific references be considered as limitations upon the scope of this invention except in-so-far as set forth in the following claims.

What is claimed is:

1. A method for sorting and processing print data, comprising the steps of:

providing a single semiconductor chip containing a main processor and plural parallel processors;

performing language interpretation tasks on said print data using said main processor to create paths;

sending said language interpretation tasks from said main processor to said parallel processors to accelerate said language interpretation tasks by using said parallel processors to perform said language interpretation tasks to divide up said paths into their respective bands;

decomposing said paths to primitives; and rasterizing said primitives using said parallel processors.

2. A method for sorting and processing print data, comprising the steps of:

using a main processor of a single-chip multiprocessor to perform language interpretation tasks on said print data and to create paths for a current page of print data;

selecting a subset of parallel processors on said single-chip multiprocessor and using said subset to accelerate said language interpretation tasks for said current page; and performing geometry processing and rasterization processing on a previous page of print data with a second subset of said parallel processors in parallel with said main processor performing said language interpretation on said current page.

3. A method of scheduling raster image processing tasks on a main processor and several parallel processors, comprising the steps of:

providing a plurality of parallel processors and a main processor, said main processor having a list of free parallel processors scheduler process running thereon;

assigning free band buffers and parallel processors to bands of print data in sequence from said list of free parallel processors;

providing a server process on a said parallel process and a band buffer;

allowing said server process on said parallel processor assigned to said bands to rasterize primitives from said bands into said band buffer;

interrupting said scheduler process when a said server process signals that it has completed said rasterization into one of said band buffers;

adding said parallel processor sending said signal to said list of free parallel processors; and transferring contents of said rasterized band buffer to a print engine.

* * * * *

UNITED STATES PATENT AND TRADEMARK OFFICE
CERTIFICATE OF CORRECTION

PATENT NO.     : 6,532,016 B1
DATED          : March 11, 2003
INVENTOR(S)    : Venkateswar et al.

It is certified that error appears in the above-identified patent and that said Letters Patent is hereby corrected as shown below:

<u>Title page,</u>
Insert Item [63]:
--           Related U.S. Application Data
Provisional Application No. 60/030,423, Oct. 25, 1996 --.

<u>Column 1,</u>
Line 4, insert: -- This application claims priority under 35 USC 119(e)(1) of provisional application number 60/030,423, filed 10/25/96. --

Signed and Sealed this

Fourth Day of November, 2003

JAMES E. ROGAN
*Director of the United States Patent and Trademark Office*